June 12, 1923.
J. WOLLMANN
WHEEL
Filed May 19, 1921
1,458,868
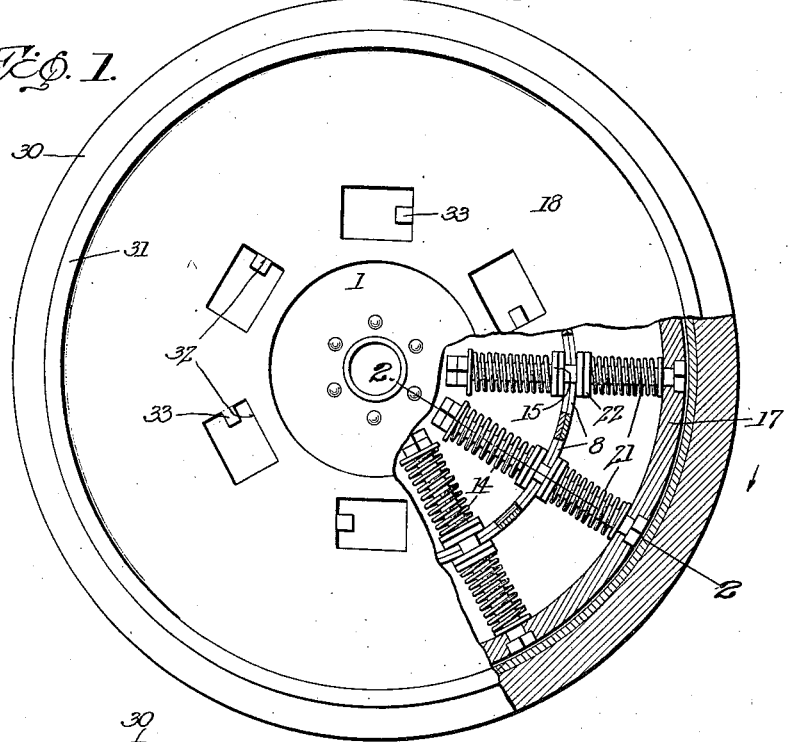
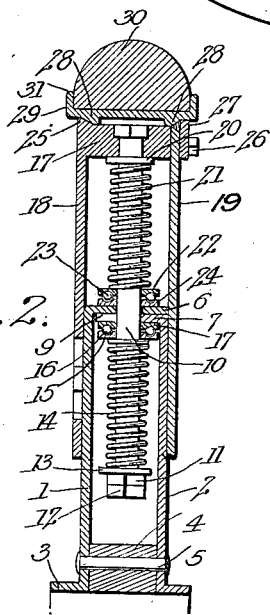
J. Wollmann,
INVENTOR
BY Victor J. Evans
ATTORNEY
WITNESS:

Patented June 12, 1923.

1,458,868

UNITED STATES PATENT OFFICE.

JACOB WOLLMANN, OF FREEMAN, SOUTH DAKOTA.

WHEEL.

Application filed May 19, 1921. Serial No. 470,808.

*To all whom it may concern:*

Be it known that I, JACOB WOLLMANN, a citizen of the United States, residing at Freeman, in the county of Hutchinson and State of South Dakota, have invented new and useful Improvements in Wheels, of which the following is a specification.

My present invention has reference to an improved vehicle wheel.

My object is to produce a spring wheel for vehicles in which the parts are so constructed and arranged as to afford the wheel all of the resiliency of a pneumatic tired wheel, while obviating the deficiencies, such as the liability to punctures, the necessity of inflation, etc., common to pneumatic tired wheels.

A further object is to produce a spring wheel in which the spring elements thereof are susceptible to adjustment and are at all times encased and consequently protected from dust, mud, and influence by the elements.

Other objects and advantages will present themselves as the nature of the invention is better understood, reference being had to the drawings which accompany and which form part of this specification.

In the drawings:—

Figure 1 is a side elevation of a spring wheel in accordance with this invention, parts being broken away and parts being in section.

Figure 2 is a sectional view approximately on the line 2—2 of Figure 1.

Figure 3 is a perspective view of one of the inner or hub members of the wheel.

The inner or hub section of my improved wheel is constructed in two parts. Each part, or section, comprises a flat disk-like member 1 and 2 respectively. Each of the members, 1 and 2, have their inner peripheries flanged outwardly, as at 3 and are spaced away from each other by a spacer ring 4 secured therebetween by suitable rivets, bolts or analogous devices 5. Each member 1 and 2 has its outer periphery flanged, as at 6 and at 7 respectively. The flange 6 of the member 1 is disposed over the flange 7 of the member 2, the flange 6 being provided with elongated openings 8, and the flange 7 being notched, as at 9, from its outer edge, the notches being in a line with the openings 8 in the flange 6. Passing through aligning openings and notches are bolt members 10. Each bolt, for approximately one half of its length is arranged between the members 1 and 2, the threaded inner end of the bolts being engaged by a nut 11 which in turn is contacted by a lock nut 12. On the nut 11 is a washer 13, the same providing a bearing for the inner convolution of a helical spring 14 that surrounds the inner end of the bolt. The outer convolution of each spring 14 is in contacting engagement with a disk or washer 15 that surrounds each of the bolts and which provides a raceway for anti-frictional balls 16. A second raceway for the balls is provided by an annular depression on the inner face of a disk or washer 17 that is in contacting engagement with the inner face of the flange 7 of the member 2. Each bolt 10 has its headed end received in a suitable pocket provided in the annular flange 17 of a flat disk or ring member 18. The ring member 18 is disposed over the outer side of the member 1, and bolted to the end of the flange 17 is a disk 19 that is disposed over the member 2. The inner face of the flange 17 is contacted by washers 20, one of such washers being arranged on each of the bolts 10 and the said washers are held in contact with the flange by a helical spring 21 that surrounds the outer end of each of the bolts 10. The inner convolution or end of each of the springs 21 is in contacting engagement with a disk 22 that also surrounds the bolt 10. Each disk 22 has its surface provided with an annular depression providing a raceway for anti-frictional balls 23. On the outer surface of the flange 6 of the member 1 and surrounding each of the bolts 10 there is a second disk 24 that is likewise provided with an annular depression in which the anti-frictional balls 23 are received. Preferably, the anti-frictional balls are disposed in contacting engagement with the bolts 10.

The disk 18 has its outer edge formed with a cross sectionally V-shaped extension 25, the outer peripheral edge of the disk 19 being beveled inwardly, and the bolts 26 that secure the disk 19 to the flange 17 of the disk 18 also serve as means for holding against the disk 19 a ring 27. The projection 25, the angle outer peripheral edge of the disk 19, and the ring 27 serve as means for contacting with the beveled outer faces of angularly arranged lugs 28 respectively on a tire carrying rim 29. A tread 30 is disposed between the flanges 31 on the edges of the tire carrying rim, the said tread being of a solid but compressible nature.

To compensate for the yielding of the outer portion of the wheel, that is the tread carrying means constituting the disks 18 and 19 and the elements associated therewith, on the inner member of the wheel which comprises the members 1 and 2, the disk 18 is provided with substantially rectangular slots or openings 32, and the member 1 is provided with lugs 33 that enter the said slots or openings. This permits of the outer member yielding on the inner or hub member in any direction, and when the lugs 33 are in contacting engagement with the end walls of the slots or notches 32, as indicated in Figure 1 of the drawing, the wheel, as a unit freely turns in the direction of the arrow in the said Figure 1. A slight amount of lost motion results when the wheel is turned in an opposite direction, sufficient to permit of the opposite ends of the lugs contacting with the opposite end walls of the slots 32.

It is thought that the foregoing description, when taken in connection with the drawings will amply set forth the construction and advantages of the improvement.

The tire rim is constructed in sections, and the nut on the bolt that goes through the rim is locked against the rim in any desired or preferred manner. The bolt has both of its ends threaded.

Having described the invention, I claim:—

A spring wheel of the character described comprising a hollow hub section, a hollow tire carrying section surrounding the hollow hub section, and having its sides lapping and in contacting engagement with the side walls of the hollow hub section, overlapping flanges forming the rim of the hollow hub section and being provided with spaced elongated openings, bolts radiating from the hollow tire carrying section and passing through the openings, thereby arranging a portion of each bolt in each section, anti-friction elements arranged in each section surrounding the bolts and engaging the flanges. adjusting means carried by the inner ends of each bolt, a spring surrounding the portions of each bolt disposed in the hollow tire carrying section and having its end convolutions engaging the rim of the hollow tire carrying section and the adjacent anti-friction element respectively, a spring surrounding the portion of each bolt disposed in the hollow hub section and having its end convolutions engaging the other anti-friction members and the adjusting means respectively, outstanding lugs formed on one side wall of the hollow hub section and one side of the tire carrying section having elongated slots for receiving the lugs.

In testimony whereof I affix my signature.

JAKIE WOLLMANN.